United States Patent
Tanaka et al.

(10) Patent No.: US 7,515,993 B2
(45) Date of Patent: Apr. 7, 2009

(54) ROBOT CONTROL APPARATUS

(75) Inventors: Michiharu Tanaka, Fukuoka (JP); Ryuichi Morita, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 749 days.

(21) Appl. No.: 10/502,944

(22) PCT Filed: Feb. 10, 2003

(86) PCT No.: PCT/JP03/01397

§ 371 (c)(1),
(2), (4) Date: Jul. 29, 2004

(87) PCT Pub. No.: WO03/071368

PCT Pub. Date: Aug. 28, 2003

(65) Prior Publication Data
US 2005/0065659 A1    Mar. 24, 2005

(30) Foreign Application Priority Data
Feb. 19, 2002    (JP)    ............... 2002-040915

(51) Int. Cl.
*G06F 19/00*    (2006.01)
(52) U.S. Cl. ............... 700/264; 700/245; 700/3; 700/102; 707/104.1; 318/568.1
(58) Field of Classification Search .......... 700/245, 700/264, 3, 102; 707/104.1; 318/568.1
See application file for complete search history.

(56) References Cited

U.S. PATENT DOCUMENTS

| | | | | |
|---|---|---|---|---|
| 4,538,233 A | * | 8/1985 | Resnick et al. | 700/252 |
| 4,761,745 A | * | 8/1988 | Kodaira | 700/254 |
| 4,803,613 A | * | 2/1989 | Kametani et al. | 700/3 |
| 5,216,613 A | * | 6/1993 | Head, III | 700/102 |
| 5,243,266 A | * | 9/1993 | Kasagami et al. | 318/568.1 |
| 5,333,319 A | * | 7/1994 | Silen | 718/103 |
| 5,428,777 A | * | 6/1995 | Perliski et al. | 707/1 |
| 5,675,229 A | * | 10/1997 | Thorne | 318/568.11 |
| 5,737,737 A | * | 4/1998 | Hikida et al. | 707/104.1 |
| 5,930,524 A | * | 7/1999 | Sasaki | 710/19 |
| 6,282,460 B2 | * | 8/2001 | Gilliland et al. | 700/255 |
| 6,853,878 B2 | * | 2/2005 | Hirayama et al. | 700/245 |
| 7,164,971 B2 | * | 1/2007 | Ferla et al. | 700/264 |

(Continued)

FOREIGN PATENT DOCUMENTS

JP    5-113818 A    5/1993

(Continued)

Primary Examiner—Thomas G Black
Assistant Examiner—Wae Louie
(74) Attorney, Agent, or Firm—Sughrue Mion, PLLC (57) ABSTRACT

A robot control apparatus for controlling a robot based upon a work program registered in storage means. A program display means is provided for displaying said work program in a list form. A child program list producing means retrieves another work program which is called by said work program and produces a child program list thereof A mother program list producing means retrieves another work program which calls said work program, and produces a mother program list. A related program storage means stories both said child program list and said mother program list in said storage means. A display selecting means selects a display way when said work program is displayed in the list form.

3 Claims, 7 Drawing Sheets

U.S. PATENT DOCUMENTS

| | | | |
|---|---|---|---|
| 7,177,724 B2 * | 2/2007 | Cantello et al. | 700/264 |
| 2002/0062463 A1 * | 5/2002 | Hines | 714/38 |
| 2003/0040840 A1 * | 2/2003 | Hirayama et al. | 700/245 |
| 2003/0056192 A1 * | 3/2003 | Burgess | 717/100 |
| 2005/0065659 A1 * | 3/2005 | Tanaka et al. | 700/264 |

FOREIGN PATENT DOCUMENTS

JP 6-33207 U 4/1994

* cited by examiner

ROBOT CONTROL APPARATUS

TECHNICAL FIELD

The present invention relates to a robot control apparatus. More specifically, the present invention is directed to a robot control apparatus for displaying names of work programs in a list form by way of a tree structure, which concerns work programs for executing a predetermined work, and for checking as to whether or not a related program has been registered when the robot control apparatus is initiated.

BACKGROUND ART

Figure 7:
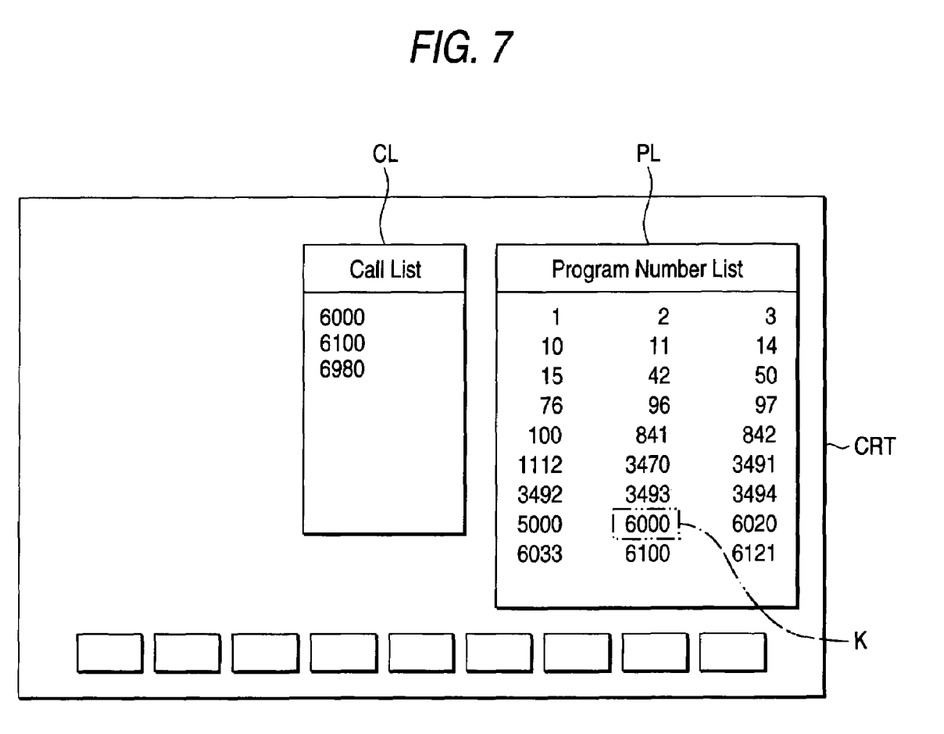
FIG. 7 is an explanatory diagram for explaining the CRT screen of the conventional technique.
Figure 8:
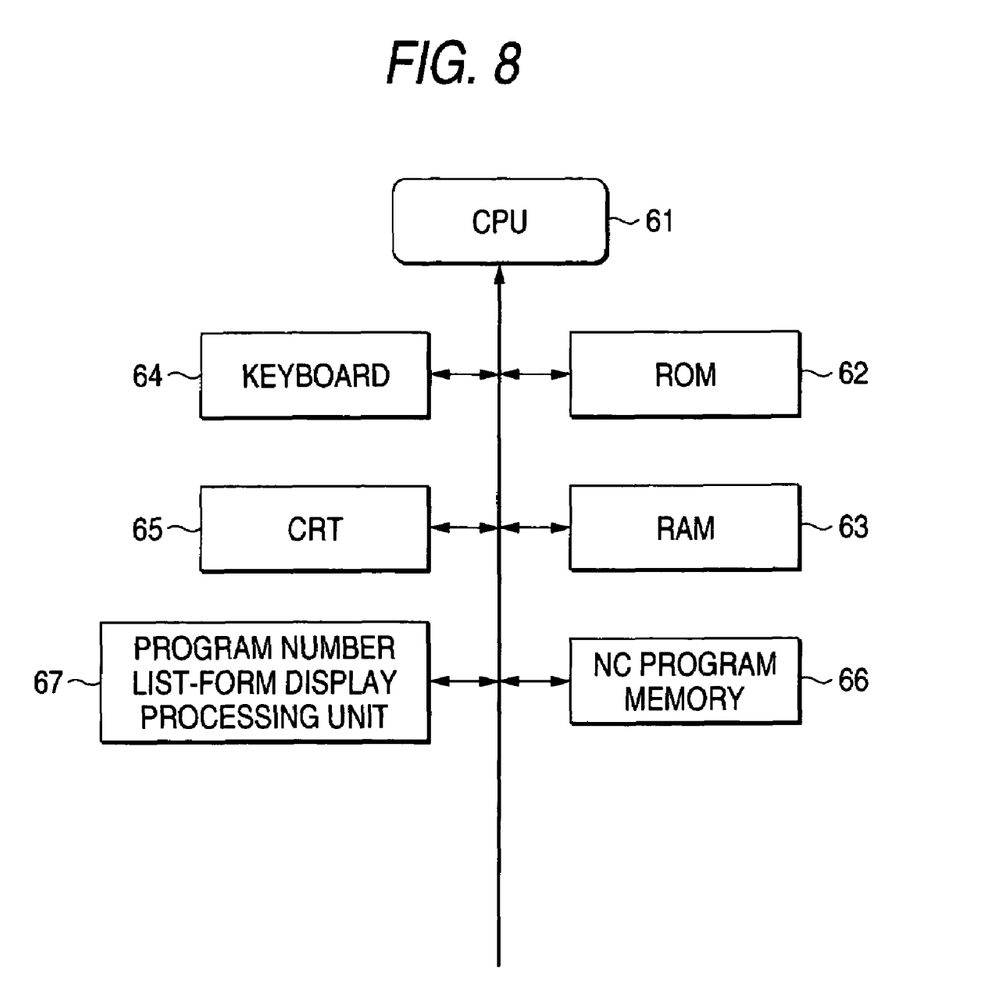
FIG. 8 is a block diagram of the conventional technique.

As an apparatus capable of easily understanding a program display, one conventional apparatus is disclosed in Japanese Laid-open Utility Model Application No. Hei-6-33207. Referring now to FIG. 7 and FIG. 8, this conventional apparatus will be explained. FIG. 8 is a structural diagram of the conventional apparatus. Reference numeral 61 shows a central control apparatus (CPU) for controlling this apparatus in a unified manner; reference numeral 62 shows a control program memory (ROM) for storing thereinto a control program which executes a list-form display processing operation of program numbers of an NC program; and reference numeral 63 indicates a RAM for storing thereinto the data based upon sorts of the files, such as data under execution, or multiplicity data indicating frequencies of use of the programs to be displayed in a list form, and so on. Also, reference numeral 64 represents a keyboard which is used to select a desirable program from a main program by the keyboard operation; reference numeral 65 indicates a display apparatus (CRT) for displaying the list-form display data of the program numbers; reference numeral 66 shows an NC program memory for storing thereinto an NC program; and reference numeral 67 indicates a program number list-form display processing unit for performing the list-form display process operation of the program numbers of the NC program.

When the list-form display data of the NC program numbers, and the like are outputted on the CRT 65, the CRT screen display is made as shown in FIG. 7. That is to say, when an operator designates a certain program number of a predetermined NC program, the CPU 61 reads the predetermined NC program (namely, main program) from the program memory 66, and sequentially stores only the numbers of such programs linked to the main program into the RAM 63. The CPU 61 displays the numbers of the stored programs as a sequential list on an area PL of "program number list" on the CRT screen, and displays the numbers of the stored programs on an area CL of "call list" in such a case that program numbers as to a family relationship of a desirable program. It should be noted that symbol "K" indicates a cursor. The cursor K displayed by the frame indicated by a two-dot chain line is set to the number of the desirable program, so that the number of the program within the cursor K is designated.

Next, a flow operation of the program number list-form display processing unit 67 is explained. It is so assumed that while a desirable main program has been previously designated by the operator, a number list of programs linked to the main program is displayed on the area PL of "program number list" on the CRT screen. The operator selects a desirable program number so as to initiate the program list-form display process operation.

The CPU 61 executes a reading process operation in such a manner that the selected program number is read every 1 block, or several blocks. The CPU 61 determines as to whether or not the read block corresponds to a sub-program calling instruction. When a program number is read, since multiplicity data is added thereto, the CPU 61 can discriminate a family relationship among programs.

In the apparatus disclosed in the prior art, while the operator recognizes which main program is selected, the operator must designate the program number thereof. As a consequence, in general, there are many cases such that a main program can be discriminated from a sub-program based upon digits of numbers. To conduct such a program management, some sort of the rules for a program numbering way must be produced by all of the operators. As a consequence, in the case such that a digit of a program number is erroneously entered, a main program cannot be found out. Also, with respect to work programs for operating industrial robots, due to a technical revolution of the semiconductor memory technologies, huge numbers of programs comes to be registered, so that so much cumbersome operations are required for locating a main program from a program list.

Also, since programs are sequentially analyzed when a main program is designated, in the case such that programs are large, lengthy time might be required. In other words, the following problem would occur. That is, since a family relationship of programs cannot be immediately discriminated after a main program initiation signal is entered, such an apparatus which is disclosed only in the list-form display cannot be applied.

DISCLOSURE OF THE INVENTION

The present invention has been made to solve the above-described program, and has an object to provide a robot control apparatus in which during work programs related to a work program being retrieved and the retrieved work programs being stored in a related program storage means, a work program list can be displayed based upon the related program storage means, and an arbitrary selection can be made in such a manner that only selected work programs are displayed. When the robot control apparatus is initiated, a program check can be immediately carried out.

A robot control apparatus, recited in claim 1 of the present invention, is featured by such a robot control apparatus for controlling a robot based upon a work program registered in storage means, comprising: program display means for displaying the work program in a list form; child program list producing means for retrieving another work program which is called by the work program, and produce a child program list; mother program list producing means for retrieving another work program which calls the work program and produce a mother program list; related program storage means for storing both the child program list and the mother program list in the storage means; and display selecting means for selecting a display way if the work program is displayed in the lit form.

A robot control apparatus, recited in claim 2 of the present invention, is featured by that the display selecting means is comprised of: related program display selecting means for displaying the work program in the list form based upon the content of the related program storage means; and total programs display selecting means for displaying the work program in the list form irrespective of the content of the related program storage means.

A robot control apparatus, recited in claim 3 of the present invention, is featured by that the robot control apparatus is comprised of: display designating means for designating a work program to be displayed; designated program storage means for storing thereinto a program designated by the display designating means; and designated program display selecting means for displaying thereon only the work program designated by the display designating means.

BEST MODE FOR CARRYING OUT THE INVENTION

Figure 1:
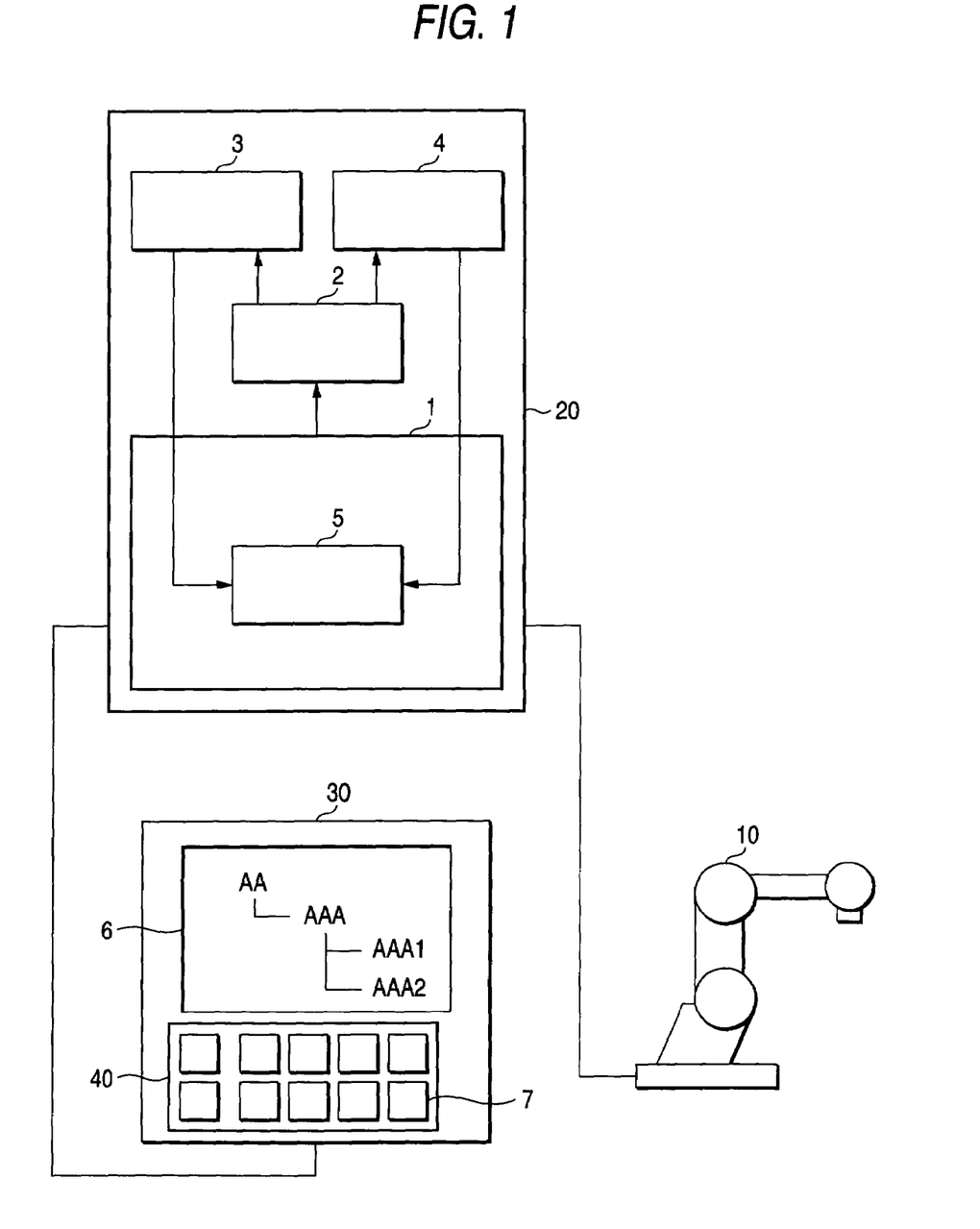
FIG. 1 is an outline diagram of a first embodiment mode of the present invention.

A first embodiment mode of the present invention will now be described with reference to drawings. FIG. 1 is an outline diagram as to the present invention. In FIG. 1, a robot 10 whose position, work, and the like shall be taught is controlled by a robot control apparatus 20. A teaching pendant 30 is connected to the robot control apparatus 20. An instructor operates the robot 10 by operating an operation key group 40, which is arranged on the teaching pendant 30, so as to produce a work program "AAA", for example. The robot control apparatus 20 contains a storage means 1. Also, the robot control apparatus contains a child-program list producing means 3 and a mother-program list producing means 4. The child program list producing means 3 retrieves another work program which is called by a work program 2, and produces a child program list. The mother program list producing means 4 retrieves another work program which calls the work program 2, and produces a mother program list. Also, a program display means 6 for displaying work programs in the list form is contained in the teaching pendant 30, and a display selecting means 7 for selecting a display way when the work programs are displayed in the list form might be designated by the specific keys that are contained in the operation key group 40.

Figure 2:
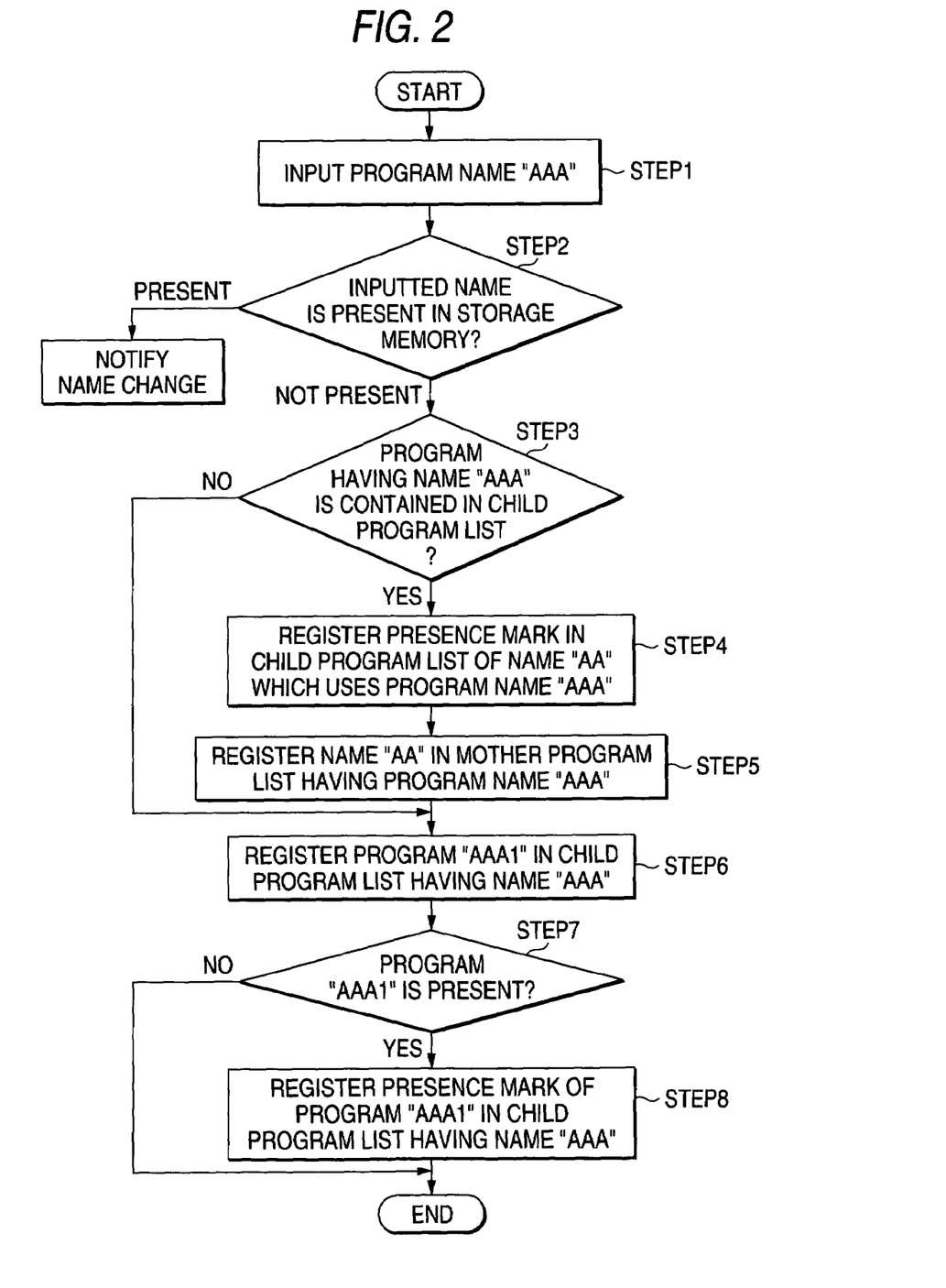
FIG. 2 is a flow diagram for explaining related program information.

Referring now to FIG. 2, a description is made of such a case that the work program "AAA" calls a sub-program "AAA1" and another sub-program "AAA2". In a step S1, a name of a work program is entered. In this step S1, a message for prompting an input of a name is displayed on the program display means 6 of the teaching pendant 30 from a CPU (not shown) of the robot control apparatus 20. Subsequently, the instructor enters an arbitrary name "AAA" of a title related to a work.

In a step S2, the CPU confirms that the entered name AAA is not present in the storage means 1 contained in the robot control apparatus 20. If the entered name AAA is present in the storage means 1, then the CPU notifies such a fact that the same program name is present on the display screen 5 to the instructor, and requests this instructor to change the program name AAA.

Figure 3:
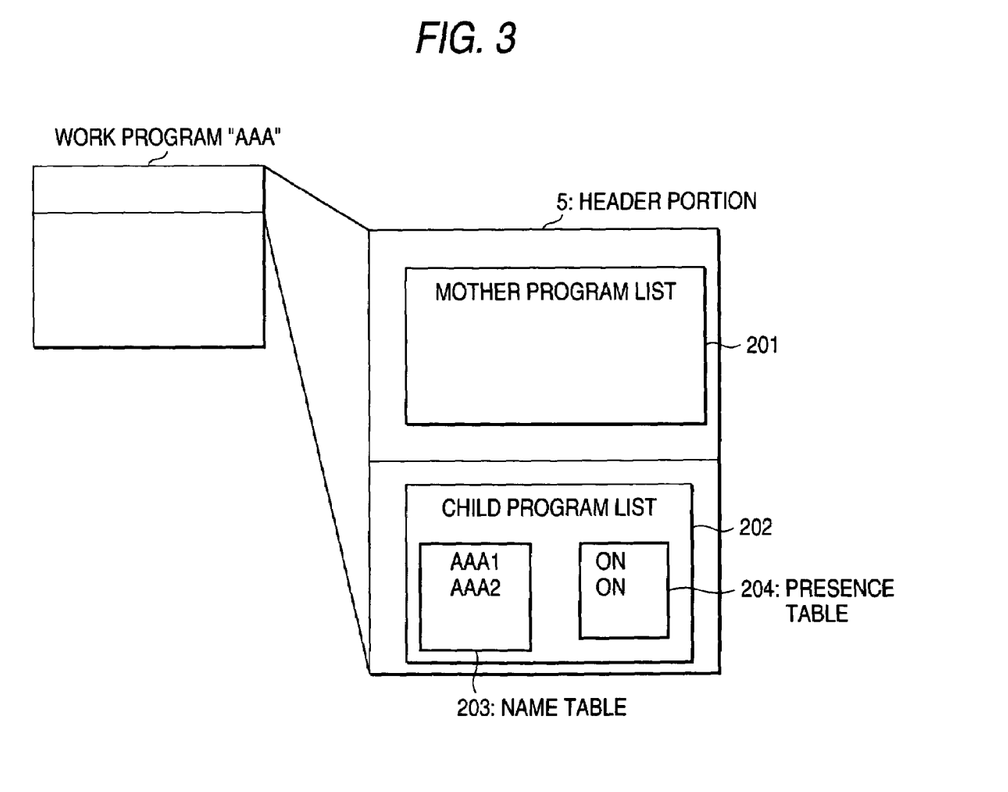
FIG. 3 is a structural diagram of a related program storage means.

In a step 3, a relationship between the program name AAA and other programs is investigated. The child program list producing means 3 sequentially reads header portions of the work programs. As one example of the related program storage means 5, a header portion, which is managed in a paired form with respect to the work program, is indicated in FIG. 3. The CPU determines as to whether or not the work program name AAA is listed up in the child program list 202 of this header portion (related program storage means) 5. As the determining method, in the case that the work program name AAA is present in the child program list 202 of the sequentially read header portion (related program storage means) 5, the process operation is branched to a step 4. In the case of the work program name AAA being not present in the child program list 202, the process operation is branched to a step 6.

The child program list 202 includes both a name table 203 and a presence table 204.

In a step 4, the child program list producing means 3 makes a mark of program presence in the presence table 204 contained in the child program list 202 of the header portion (related program storage means) 5 of a work program "AA" which is using the work program "AAA".

At a step 5, the mother program list producing means 4 registers the work program name AA in the mother program list 201 of the header portion (related program storage means) 5 of the work program name AAA, and makes a mark of presence.

In a step 6, the work program name AAA corresponds to a process operation when a command for calling the work program name AAA1 is added, or in such a case that an editing operation of the work program AAA is completed. At this time, if the work program AAA is completely independent from other work programs, then the program name is not registered in the mother program list 201 and the child program list 202.

The child program list producing means 3 registers the work program names AAA1 and AAA2 into the name table 203 contained in the child program list 202 of the header portion (related program storage means) 5 of the work program AAA. In a step 7, the CPU checks as whether or not both the work program AAA1 and the work program AAA2 are present in the storage means 1. When the work programs AAA1 and AAA2 are present in the storage means 1, the process operation is branched to a step 8.

In the step 8, the CPU makes such a mark that the work programs AAA1 and AAA2 are present in the presence table 204 contained in the child program list 202 of the work program AAA. At the same time, the mother program list producing means 4 registers the work program AAA into the mother program list 201 of the header portion (related program storage means) 5 of the work programs AAA1 and AAA2.

In the above-described embodiment, the related program storage means 5 has been managed in the same region as the work program. Alternatively, as another method, even if the related program storage means 5 is managed in a region, which is completely different from that of the work program, then a similar effect may be achieved.

Figure 4:
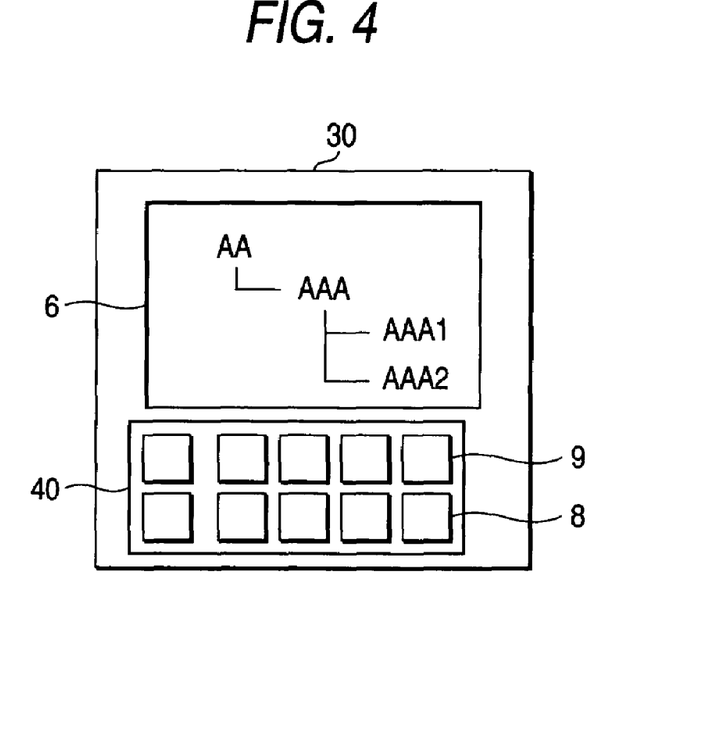
FIG. 4 is a diagram for displaying a related program.
Figure 5:
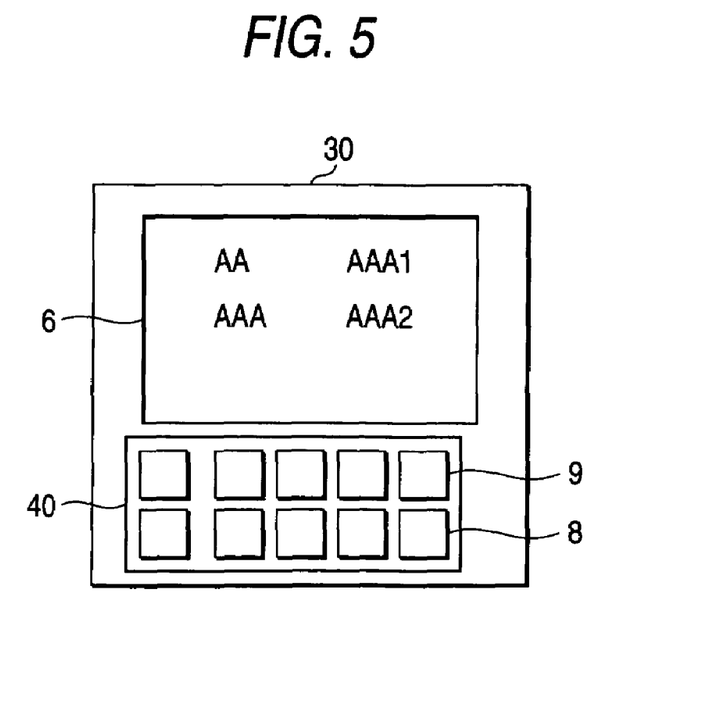
FIG. 5 is a diagram for displaying all of programs.

Next, if the work programs are displayed in a list form, then the display selecting means 7 can select a display way. This selecting operation is explained with reference to FIG. 4 and FIG. 5. In this embodiment, a specific operation key of the operation key group 40 is allocated to the display selecting means 7. In the case that the related program display selecting means 8 is depressed, as indicated in FIG. 4, the list of the work programs is displayed on the display means by way of a tree structure in such a manner that programs to which the work program is related can be understood by the operator at first glance. In the case that the total programs display selecting means 9 is depressed, as represented in FIG. 5, all of the programs are displayed. In this case, such information for indicating that which programs are related to each other is not displayed.

Also, a process operation, being executed when an automatic operation is carried out, will now be explained with reference to FIG. 3. In such a case that the work program AA is selected, and an initiation instruction is entered from the robot control apparatus 20, the CPU reads a header portion (related program storage means) 5 of the work program AA from the storage means 1. The CPU refers to the presence table 204 of the child program 202 of the header portion (related program storage means) 5, and sets an alarm in such a case that the presence mark is not located in the presence table 204. In other words, in the case that the mother work program is selected and is initiated, the CPU can immediately determine that a child program, which is called by this work program, is not formed.

Figure 6:
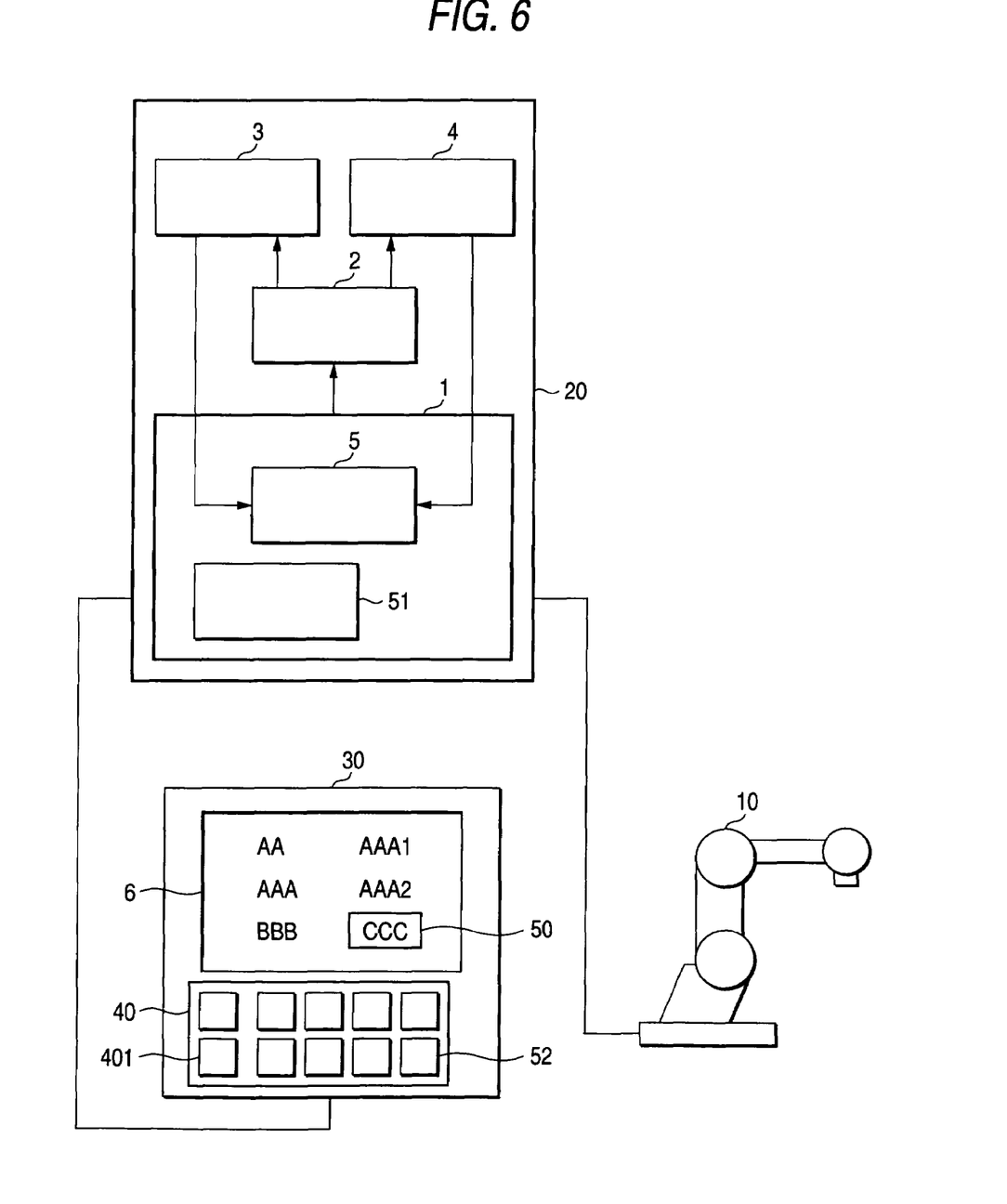
FIG. 6 is a diagram for displaying a designated program.

Referring now to FIG. 6, a description is made of a second embodiment mode according to the present invention. In FIG. 6, a display designating means 50 may be freely moved on a screen by using so-called "cursor" as the display designating means 50. Since the cursor 50 is moved to a program name, which is desired to display from a list of programs, and then, an operation key 401 is depressed, this program name is registered in a designated program storage means 51 contained in the storage means 1. In this case, either names of work programs or specific numbers (ID) designated by the CPU has been registered. When a designated program display selecting means 52 is depressed, the CPU displays only display programs on the display means 6, which have been registered in the designated program storage means 51. As another embodiment, the display designating means 50 may be alternatively designated by entering the name, which is resulting in a similar effect.

Other than the above-explained embodiments, even if the display selecting means 7, the related program display selecting means 8, the total programs display selecting means 9, and the designated program display selecting means 52 can be produced on the program display means 6 by a computer graphic manner, and also, a touch panel can be employed, then a similar effect may be achieved.

As previously described, in accordance with the robot control apparatus of the present invention, since this invention can makes it possible to display the family relationship among the work programs in the list form, inputting the wrong work program name by the operator's mistake can be avoided, and also, other erroneous operations (e.g. a case that the requested program is not present) can be avoided accordingly. Also, a cumbersome operation such that the instructor must retrieve a mother program from a huge number of the programs can be thus eliminated. Simultaneously, if the child program of the loaded program has not yet been registered, the robot can be stopped before this robot is operated so that security of the system can be thus improved.

INDUSTRIAL APPLICABILITY

The present invention is related to the robot control apparatus, and more specifically, it is a useful robot control apparatus capable of simply managing the work program's names which are requested to execute the predetermined works.

The invention claimed is:

1. A robot control apparatus for controlling a robot based upon a work program registered in storage means, comprising:
   program display means for displaying said work program in a list form;
   child program list producing means for retrieving another work program which is called by said work program and produce a child program list thereof;
   mother program list producing means for retrieving another work program which calls said work program, and produce a mother program list;
   related program storage means for storing both said child program list and said mother program list in said storage means; and
   display selecting means for selecting a display way when said work program is displayed in the list form.

2. A robot control apparatus as claimed in claim 1 wherein:
   said display selecting means is comprised of:
   related program display selecting means for displaying said work program in the list form based upon the content of said related program storage means; and
   total programs display selecting means for displaying said work program in the list form irrespective of the content of said related program storage means.

3. A robot control apparatus as claimed in claim 1 wherein:
   said robot control apparatus is comprised of:
   display designating means for designating at least one of work programs being displayed in said program display means;
   designated program storage means for storing thereinto a title or a specific numbers (ID) of the designated program by said display designating means; and
   designated program display selecting means for displaying thereon only the title of the work program designated by said display designating means.

* * * * *